Feb. 21, 1956     F. W. GLASER     2,735,155
PRODUCTION OF METAL BORIDE WITHOUT AND WITH AN EXCESS OF BORON
Filed Aug. 15, 1951
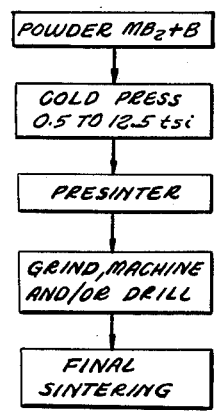
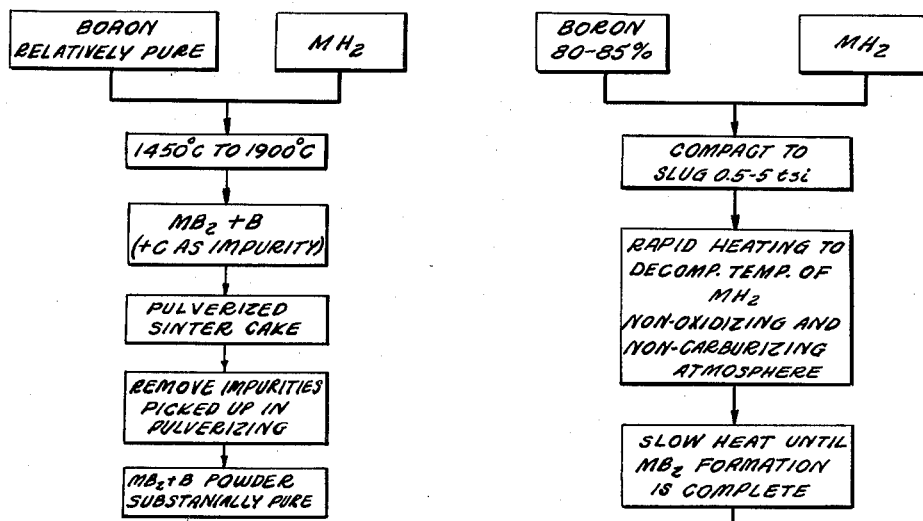
INVENTOR.
FRANK W. GLASER
BY
ATTORNEYS United States Patent Office 2,735,155
Patented Feb. 21, 1956

2,735,155

PRODUCTION OF METAL BORIDE WITHOUT AND WITH AN EXCESS OF BORON

Frank W. Glaser, New York, N. Y., assignor, by mesne assignments, to Borolite Corporation, Pittsburgh, Pa., a corporation of Delaware Application August 15, 1951, Serial No. 241,991

8 Claims. (Cl. 25—156)

This application is a continuation in part of application Ser. No. 170,240, filed June 24, 1950.

This invention relates to refractory compositions of matter or structural materials which exhibit great hot-strength and corrosion-resistance at elevated temperatures and to the production of such hot-strength corrosion-resistant refractory structural materials.

The hot-strength corrosion-resistant structural materials of the invention are useful for buckets, vanes, nozzles, and other like structural parts of gas turbines, as well as other combustion engines, for tools, and in general for all applications where great strength and corrosion-resistance at high temperatures in oxidizing atmospheres is essential.

Although prior scientific and patent literature contains an abundance of data about the physical properties of hard cemented carbides, and also about the properties of chromium boride, such as described in Cole et al. Patent No. 2,208,838, it does not contain any data about the physical properties of cemented metal borides.

In making such hard cemented refractory boride bodies, it was heretofore generally believed that in order to give them desired high mechanical strength, it was essential to use, as cementing addition, metals which are ductile, and which have a considerably lower melting temperature than the refractory boride.

The present invention is based on the discovery that boron, a substance which lacks ductility, and which has not been considered a metal, constitutes an unusually effective addition substance for use in lieu of known ductile cementing metals of relatively low melting point, such as cobalt and nickel, in making hard cemented refractory boride bodies.

In particular, the invention is based on the discovery that cemented, compacted and sintered structural material combining refractory metal boride particles with an addition of boron exhibit desired great hot-strength at temperatures as high as 1200° C. and higher, and great corrosion-resistance at temperatures as high as 2500° C. and higher.

In general, desirable cemented refractory boride bodies of the invention, may be made by combining from about .5% up to about 45% of the boron addition substance with the refractory metal boride particles as the balance.

A unique characteristic of the refractory metal boride compositions of the invention combining a boron addition with the refractory metal boride particles is the fact that they also exhibit an unexpected high electrical and heat conductivity, notwithstanding the fact that boron is a poor electric and heat conductor. This is a feature of critical importance in applications such as gas turbine buckets and tool materials. It is believed that the high electrical and thermal conductivity is due to a phase formed by boron with the metal constituent or constituents of the metal borides or boride when producing cemented refractory metal boride compositions of the invention. As an illustration, cemented zirconium-boride material of the invention made with an addition of about 10% boron, has a modulus of rupture of 130,000 p. s. i. (pounds per square inch), Rockwell A hardness 93, density 5.35 g./cc., and electrical resistivity 14.5 microhms-cm.

A distinct phase of the invention is a discovery that cemented refractory bodies combining particles of a boron addition with particles of refractory borides may be produced by mixing a compound of the metal of the desired boride, such as the metal hydride, with boron in proportions corresponding to the formulae of the mixture of the desired boride with the boron addition. This phase of the invention greatly simplifies the problem of providing the desired refractory metal boride in a degree of purity most suitable for producing cemented bodies combining the boride with the boron addition in accordance with the principles of the invention.

The present invention will be described by way of example, as applied to the production of cemented bodies combining zirconium boride and boron addition particles, the same principles being applicable to the production of cemented bodies combining an addition of boron particles with the borides of titanium, vanadium, columbium, tantalum, chromium, tungsten and molybdenum.

It has been found that the zirconium boride-boron compositions are so refractory and corrosion resistant that the presence of any substantial amount of extraneous material in the composition will reduce its refractory and corrosion-resistant properties. The additional deleterious materials may get into the final product in several ways. Two primary causes of the impurities in the final product are (1) the impurities introduced by the raw materials used to make the product and (2) the impurities introduced by the treating apparatus. When the raw materials or partially prepared composition is ground, or milled, for example, it may be contaminated by eroded parts of the grinding apparatus. When the powdered composition is hot pressed to form the final product, the composition may be contaminated by the carbon from a graphite mold, etc.

Another object of the invention, therefore, is to produce a molded product which is substantially uncontaminated by lower melting components.

These objects and others ancillary thereto are obtained by treating the hydride of the metal from which it is desired to form the boride with an excess of boron in a non-oxidizing non-carburizing atmosphere at such a temperature that the hydride decomposes and the metal boride is formed. Substantially pure boron may be employed so as to give a product which is not contaminated by low melting compounds. It is also possible to employ relatively impure boron and remove the undesirable impurities as a part of the reaction process. Since the impurities ordinarily have a boiling point which is lower than the melting point or boiling point of the boride-boron mixtures, the impurities can be eliminated in the heating process. The heating cycle may be run in two or three steps. In the first step the mixture of metal hydride and boron is heated rapidly until the hydride is decomposed. The rapid heating permits as little time as possible for oxidation. In the second step the heating is continued slowly to prevent a violent reaction during the formation of the metal boride. In the third step the heating is continued to evaporate and drive off the lower boiling impurities. The heating in the third step cannot be too high, however, because there is also a tendency to pick up carbon. This third step can be omitted when pure boron is employed.

A very convenient way to handle the powdered material during the heating cycle is to first form the powdered metal hydride and powdered boron mixtures into slugs, for example at a pressure of around 5 t. s. i. These slugs can then be heated in a carbon crucible or in other apparatus such as a crucible made of the metal boride and boron mixture itself. After the heating cycle and reactions are complete the so treated slugs are crushed to powder form and then very finely ground or disintegrated to a size of about 3–4 microns. Impact types of pulverizers wherein a high velocity is imparted to the particles by a gaseous stream and the particles are pulverized by violent impacts with one another are very suitable since almost no grinding apparatus is as hard as the boride-boron mixtures of the invention. Even with impact mills the resultant powder must be leached with acid or other solvent and dried to remove the inclusions caused by the erosion of the mill surfaces etc.

The resultant powder may then be formed into the final product by a hot pressing or a cold pressing process. In the hot pressing process it has now been found that since there is considerable shrinkage of the product during cooling (12–15% for a product containing 15% of excess boron), the cracking of the product can be prevented by ejecting the product from the mold at temperatures around the hot pressing temperature (2200° C. for example). In this way the different coefficients of expansion of the mold and the boride product do not conflict with one another during cooling to cause sticking to the mold and cracking of the product.

A distinct phase of the invention is a simplified novel process for producing shaped bodies out of such cemented materials. In this process a binder such as camphor or gum acacia is added to the powder and the powder is cold pressed in steel dies, for example. This product is then presintered. Subsequent to the presintering and before the final sintering the product can be further machined by grinding off rough spots, drilling, polishing, etc. During both the presintering and final sintering the density of the body increases.

The principles of the invention will now be more fully described in connection with specific exemplifications of the same, reference being had to the accompanying drawings wherein:

Fig. 1 is a flow diagram showing one method of preparing a metal boride-boron composition of the invention.

Fig. 2 is a flow diagram showing another method of preparing a metal-boride-boron composition of the invention.

Fig. 3 is a flow diagram showing the steps for producing a shaped structure from the powdered material by one procedure exemplifying the invention.

As illustrated by Fig. 1 one method of obtaining the non-contaminated powder is to mix substantially pure boron with a metal hydride of the metal desired in the proper proportions to form the metal boride and the excess boron desired. The boron can be added in amounts of from 2–25% or more in excess of the amount required to form the boride. One unexpected advantage of the boride products of the invention is the high electric conductivity but with over 20% of boron in excess, the electric resistivity of the body increases. The mixture of boron and metal hydride is then heated in a non-oxidizing atmosphere until the hydride is decomposed and until the metal combines with boron to form the metal boride. The reaction is complete at a temperature between 1450° C. and 1900° C. A satisfactory non-oxidizing atmosphere is hydrogen. When the raw materials are heated in a carbon crucible a considerable carbon pick up is noted in the product.

Fig. 2 illustrates an improved process in which it is possible to employ the more impure and less expensive commercially available boron. The most common impurity in the commercially available boron products is magnesium, probably present as magnesium boride, with smaller amounts of silicon and aluminum and traces of copper, iron, lead and tin. As shown in Fig. 2 the boron and metal hydride powders are mixed and compacted to form a slug at pressures of 0.5 to 5.0 t. s. i.

The slugs are rapidly heated in an atmosphere of dry hydrogen, for example, to allow as little time as possible for oxidation and the temperature is raised until the atomic hydrogen resulting from the decomposition of the metal hydride is eliminated. Then the heating is continued slowly until the formation of the metal boride is complete. If pure boron has been employed the heating may now be discontinued. However, with the impure boron the temperature is again raised to cause evaporation of the magnesium, magnesium boride and other impurities. (Magnesium boride decomposes at temperatures below 1150° C.) The higher the temperature is raised the faster will the volatile materials be removed but care must be taken to keep the temperature below that at which there is a considerable carbon pick-up from carbon crucibles, for example. The resultant slugs are cooled and crushed and then the powder is further disintegrated to a size of 3–4 microns. After the powder has been reduced to the proper size the pick up from the milling or disintegrating apparatus is removed by leaching, etc.

The powder produced by the process of Fig. 1 or Fig. 2 can be worked up into the final product by the improved process illustrated in Fig. 3. The powder is first mixed with ½ to 2½% of a lubricant, such as camphor or a gum and is then cold pressed to the form desired at a pressure of 0.5 to 12.5 t. s. i. The addition of the camphor eliminates to a large extent any pressing laminations that ordinarily occur during cold pressing. The cold pressed products are then presintered. After the presintering additional machining operations may be carried out. The rugh spots, sprues etc., may be removed and the product may be drilled. Then the resultant product is subjected to the final sintering.

The powders produced by the process of Fig. 1 or 2 may be hot pressed also. In this process the powder is fed to a graphite mold which in turn is held between copper electrodes. The powder is pressed into the mold and simultaneously an electric current is passed through the electrodes, mold and powdered material. A temperature of around 2200° C. is built up. To prevent sticking to the mold and cracking of the product, the latter is ejected from the mold at about 2200° C. and then cooled either in the air or in a pack of lampblack or like carbon powder.

The process of making the boride-boron powder and molding the same is especially suitable for the manufacture of zirconium boride products containing 2–25% of excess boron over that required to form $ZrB_2$. However, the processes are of general application and may be employed for the manufacture of boron bonded borides of titanium, columbium, chromium, vanadian, tantalum, tungsten, molybdenum and mixtures thereof.

The following examples illustrate how the process is carried out.

Example 1

93 parts of zirconium hydride and 33 parts by weight of substantially pure boron are milled separately or together in a ball mill in a cover or bath of mineral oil and an atmosphere of argon gas so as to suppress oxidation of the boron. The resultant particles after separation from the oil are leached with acid solution to remove iron etc., introduced by the milling step. Thereafter, the particles are treated with alcohol and dried. The resultant powder is then placed in a carbon crucible and heated to 1750° C., in an atmosphere of hydrogen or cracked ammonia for about 30 minutes. This product consists of $ZrB_2$ and B and a small amount of carbon probably in the form of boron carbide. The material is ground and can be hot pressed or cold pressed and sintered to form the desired articles.

Example 2

93 parts of zirconium hydride are disintegrated to an average particle size of 3–5 microns and mixed with 35 parts of powdered commercially available boron containing 81.5% by weight of boron, which has been powdered to substantially the same degree of fineness. The mixture is compacted to form slugs at a pressure of approximately 5 t. s. i. The compacted slugs are placed in a carbon crucible and heated in a hydrogen atmosphere. The temperature is raised as rapidly as possible from room temperature up to the temperature at which hydrogen is evolved. Thereafter, the temperature is raised slowly up to about 1150° C. At this temperature the zirconium boride is formed, any magnesium boride which is present is probably also decomposed at or somewhat below 1150° C. To insure completeness of the boride formation the temperature is slowly increased to 1200° C. and maintained for a time at this temperature. The temperature is then raised to 1450° C. at which the magnesium present is evaporated off. At the higher temperatures the magnesium is evaporated faster but care is taken not to exceed the temperature of 1700° C. because of the excessive carbon pick-up at the higher temperatures.

The carbon content due to carbon pick-up is about 0.5 to 1.2% of the material. With a greater excess of boron, the carbon pick-up may increase to 1.5%. The additional carbon pick-up of the higher boron materials appears to be due to the longer period of heating at high temperatures which is required to evaporate the magnesium.

The resultant slugs which consist essentially of $ZrB_2$ and boron are crushed to a size of —100 mesh and then further disintegrated to a fineness of 3–5 microns in an impact disintegration. The resultant powder is leached, washed with alcohol and dried and is then ready to be formed into shaped products by hot pressings or by cold pressings and sintering.

*Example 3*

Approximately 20 g. of the powder containing 90% of $ZrB_2$ and 10% of boron such as made by the process of Example 1 or 2 is mixed with about 0.2 g. of camphor and cold pressed at about 7 t. s. i. to form a rod having the density of approximately 2.9–3.0.

The rod was presintered at a temperature of 950–2000° C. for 15 minutes. The resultant product had a density of about 3.5

Thereafter, the rod was machined to remove surface imperfections and then finally sintered at about 2200° C. to 2500° C. for ½ hour. The completely sintered product had a density of approximately 5.

The sintering steps may be done with or without a protective, non-oxidizing atmosphere. Since the boron forms a protective or passive oxide coating, the protective atmosphere is not absolutely essential.

The products of the invention have high strength and great corrosion resistance at temperatures as high as 1400° C., under a load of 65,000 p. s. i. for forty hours before failure occurred. The poducts have an exceptionally high electrical and heat conductivity (similar to some of the metallic carbides). This makes the composition especially suitable in applications such as gas turbine buckets and tool materials. The products also are very hard (Rockwell hardness 89–93, for example).

In each of the processes of synthetically forming out of a metal hydride and of boron, a mixture of metal boride particles and of boron, the product resulting from the heat treatment of the mixture of the metal hydride particles and of boron forms a sinter cake which may be readily broken up into fine powder particles without requiring excessively long disintegrating processes, such as impact pulverization, ball milling or the like.

Furthermore, such synthetically produced powder mixtures—consisting essentially of refractory metal borides and of an addition of boron in excess of the amount which combines with the metal into a metal boride—have the unique property of lending themselves for producing strong bodies of complicated shape and great dimensional accuracy, for applications such as gas turbine buckets, gas turbine nozzle diaphragm vanes or the like, without recourse to hot pressing and without requiring extended machining operation on the very hard finally formed body. Thus, by way of example, synthetically produced powder mixtures of the type described above may be formed into strong corrosion-resistant gas turbine buckets by the following procedure:

A powder mixture containing about 90 parts of zirconium boride, 10 parts of boron together with about 1% of a lubricant, such as camphor is compacted, as by cold pressing, into a green compact of the desired shape and having a density of about 3.0. The dimensions and shape of the green compact are so chosen and designed as to allow for the shrinkage to which so compacted shaped bodies will undergo in the subsequent sintering and shaping operation to which they are subjected in forming out of the compact the final shaped product such as gas turbine buckets of the desired dimensional accuracy and shape and of the desired strength and corrosion-resistance.

The green shaped compact so formed is thereafter presintered, for instance, at a temperature in the range of about 1350° C. to 1800° C. for 15 minutes. The presintered shaped body so obtained is relatively soft being somewhat harder than chalk, and may be readily shaped or machined by conventional procedures and tools into the desired shaped body of the required dimensional accuracy. Allowance should however be made for the further shrinkage of the so shaped presintered compact in the course of the further sintering treatment whereby the material of the body is given its ultimate physical characteristics of great strength and corrosion-resistance.

After the shaping operation, the presintered shaped bodies are subjected to the final sintering treatment at about 2200° C. to 2500° C. for about ½ to 1 hour. In this final sintering treatment, the shaped bodies, such as the turbine buckets, acquire the ultimate physical characteristics of great strength and corrosion-resistance within hot oxidizing combustion gas atmospheres which enables them to operate for long periods of useful life at temperatures about 900° C., such as 1200° C. to 1300° C. and even up to 1500° C., while revolving at a high speed.

After the final sintering treatment, it is merely necessary to subject the so obtained shaped bodies, such as gas turbine buckets, to the final finishing and polishing operation thereupon they are ready for mounting in the turbine rotor.

The present application is directed to the production of high purity metal boride powders without and with an excess of boron. Other phases of the invention disclosed herein involving the production of hard cemented refractory metal boride bodies constitute the subject-matter of my co-pending applications Serial No. 363,043, filed June 22, 1953; Serial Nos. 546,259 and 546,260, filed November 10, 1955; and Serial Nos. 546,782 and 546,783, filed November 14, 1955, as continuations-in-part of my prior applications Serial Nos. 170,240, 170,241, 170,242, 170,243, and 170,244, filed June 24, 1950, and now abandoned.

The novel principles of the invention will suggest various modifications thereof and it is accordingly desired that the invention shall not be limited to any of the specific exemplifications described herein.

I claim:

1. The method of producing a substantially pure homogeneous powder mixture consisting essentially of a refractory metal boride and boron, which comprises the steps of providing an intimate initial mixture of powder particles of a major ingredient consisting essentially of at least one hydride of a metal selected from the group consisting of zirconium, titanium, vanadium, chromium, tungsten, molybdenum and mixtures thereof with powder particles of additional ingredients consisting essentially of boron, compacting said mixture under pressure to form a compact, heating of said compact at elevated temperature at which said major ingredient decomposes and yields said metal, thereafter further heating of said compact at a different elevated temperature at which said yielded metal combines with said boron to form a metal boride, said ingredients containing an amount of boron in excess of the amount required to form said metal boride, thereafter still further heating of said compact at a different elevated temperature at which impurities contained in said compact are removed, and thereafter disintegrating said compact into a mixture of powder particles containing said metal boride and an excess of boron.

2. A method as claimed in claim 1, said major ingredient being zirconium hydride.

3. A method as claimed in claim 1, said additional ingredients forming from about .5% to about 45% by weight of said intimate mixture.

4. The method of producing a substantially pure homogeneous powder mixture consisting essentially of a refractory metal boride and boron, which comprises the steps of providing an intimate initial mixture of powder particles of a major ingredient consisting essentially of at least one hydride of a metal selected from the group consisting of zirconium, titanium, vanadium, chromium, tungsten, molybdenum and mixtures thereof with powder particles, of additional ingredients consisting essentially of boron, compacting said mixture under pressure of about .5 to about 5 tons per square inch, to form a compact, quickly heating said compact to an elevated temperature in a non-oxidizing and non-carburizing atmosphere at which said major ingredient decomposes and yields said metal, slowly heating said compact to a different elevated temperature of about 1200° C. at which said yielded metal combines with said boron to form a metal boride, said ingredients containing an amount of boron in excess of the amount required to form said metal boride, thereafter still further heating of said compact at an elevated temperature between about 1450° C. and about 1700° C. at which impurities contained in said compact are removed, and thereafter disintegrating said compact into a mixture of powder particles containing said metal boride and an excess of boron in an amount corresponding to the proportions in which boron and the metal of said hydride were present in said initial mixture.

5. A method for producing a substantially pure homogeneous powder mixture consisting essentially of a refractory metal boride and boron, which comprises the steps of providing a powder body consisting of an intimate initial mixture of powder particles of a major ingredient consisting essentially of at least one hydride of a metal selected from the group consisting of zirconium, titanium, vanadium, chromium, tungsten, molybdenum and mixtures thereof with powder particles of additional ingredients consisting essentially of substantially pure boron, heating said mixture at an elevated temperature of at most about 2500° C., at which said hydride decomposes and yields a metal which combines with said boron to form a metal boride, said ingredients containing an amount of boron in excess of the amount required to form said metal boride, and thereafter disintegrating the so heated powder body into a mixture of powder particles containing said metal boride and an excess of boron in an amount corresponding to the proportions in which boron and the metal of said hydride were present in said initial mixture.

6. The method of producing a boride of a metal selected from the group consisting of zirconium, titanium, vanadium, chromium, tungsten, molybdenum and mixtures thereof, which method comprises providing a mixture of powder particles consisting essentially of boron with powder particles consisting essentially of a hydride of the selected metal so that boron and the selected metal are present in said mixture essentially in stoichiometric proportions corresponding to the selected intermetallic compound, thereafter compacting said mixture and heating the compacted mixture at an elevated temperature above the temperature of the decomposition of the metal hydride to cause it to yield the selected metal, thereafter further heating said compacted mixture at an elevated temperature to cause the yielded metal to combine with the boron of the mixture into the desired metal boride and thereafter still further heating said compacted mixture at a higher elevated temperature at which impurities contained in said mixture are removed, and thereafter disintegrating said compacted mixture into powder particles of said metal boride, all of said elevated temperatures being in the range of at most about 2500° C.

7. The method as claimed in claim 1, said major ingredient being titanium hydride.

8. The method as claimed in claim 1, said major ingredient being chromium hydride.

References Cited in the file of this patent

UNITED STATES PATENTS

| | | |
|---|---|---|
| 2,412,373 | Wejnarth | Dec. 10, 1946 |
| 2,445,296 | Wejnarth | July 13, 1948 |

FOREIGN PATENTS

| | | |
|---|---|---|
| 478,016 | Great Britain | 1938 |